US010320196B2

(12) United States Patent
Gupta et al.

(10) Patent No.: US 10,320,196 B2
(45) Date of Patent: Jun. 11, 2019

(54) WIND POWER PLANT, AND A METHOD FOR INCREASING THE REACTIVE POWER CAPABILITY OF A WIND POWER PLANT (71) Applicant: VESTAS WIND SYSTEMS A/S, Aarhus N (DK)

(72) Inventors: Manoj Gupta, Singapore (SG); Abdul Saboor, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 208 days.

(21) Appl. No.: 15/103,745

(22) PCT Filed: Nov. 25, 2014

(86) PCT No.: PCT/DK2014/050400
§ 371 (c)(1),
(2) Date: Jun. 10, 2016

(87) PCT Pub. No.: WO2015/086021
PCT Pub. Date: Jun. 18, 2015

(65) Prior Publication Data
US 2016/0308369 A1    Oct. 20, 2016

(30) Foreign Application Priority Data
Dec. 11, 2013   (DK) ................ 2013 70760

(51) Int. Cl.
*H02J 3/38*        (2006.01)
*F03D 7/04*        (2006.01)
(Continued)

(52) U.S. Cl.
CPC ............ *H02J 3/386* (2013.01); *F03D 7/0284* (2013.01); *F03D 7/042* (2013.01); *F03D 7/048* (2013.01);
(Continued)

(58) Field of Classification Search
USPC ........................................... 290/44
See application file for complete search history.

(56) References Cited

U.S. PATENT DOCUMENTS 5,798,631 A * 8/1998 Spee .................... F03D 7/0272
290/31
2009/0021013 A1   1/2009 Andresen
(Continued)

FOREIGN PATENT DOCUMENTS

EP    2093420 A2    8/2009
EP    2221958 A1    8/2010
(Continued)

OTHER PUBLICATIONS

Ryan J Konopinski et al: "Extended Reactive Capability of DFIG Wind Parks for Enhanced System Performance", IEEE Transactions on Power Systems, IEEE Service Center, Piscataway, NJ, US, vol. 24, No. 3, Aug. 1, 2009, pp. 1346-1355.
(Continued)

*Primary Examiner* — Adam D Houston
(74) *Attorney, Agent, or Firm* — Patterson + Sheridan, LLP (57) ABSTRACT In various embodiments of the present disclosure, there is provided a method for increasing the reactive power capability of a wind power plant, in controlling a wind power plant. According to an embodiment, the method includes receiving a reactive power requirement from an electrical grid. The method further includes determining an active power generated by the wind power plant. According to an embodiment, the method includes checking if the reactive power requirement is satisfied by the wind power plant based on the active power generated by the wind power plant. The method further includes controlling the wind power plant to curtail the active power generated by the wind power plant by a curtailment amount when the reactive (Continued)

power requirement is not satisfied, and in response to a grid event. A corresponding wind power plant is further provided.

21 Claims, 6 Drawing Sheets

(51) Int. Cl.
*F03D 7/02* (2006.01)
*H02J 3/16* (2006.01)
*H02K 7/18* (2006.01)
*H02P 9/10* (2006.01)
*F03D 9/25* (2016.01)

(52) U.S. Cl.
CPC .............. *F03D 9/257* (2017.02); *H02J 3/16* (2013.01); *H02K 7/183* (2013.01); *H02P 9/102* (2013.01); *F05B 2270/1033* (2013.01); *F05B 2270/335* (2013.01); *F05B 2270/337* (2013.01); *Y02E 10/723* (2013.01); *Y02E 10/763* (2013.01); *Y02E 40/34* (2013.01)

(56) References Cited

U.S. PATENT DOCUMENTS

| | | | | |
|---|---|---|---|---|
| 2009/0121482 | A1* | 5/2009 | Rickard | F03B 15/00 290/44 |
| 2010/0208501 | A1* | 8/2010 | Matan | H02J 3/18 363/95 |
| 2010/0308585 | A1 | 12/2010 | Jorgensen et al. | |
| 2011/0071695 | A1* | 3/2011 | Kouroussis | H02J 3/1892 700/295 |
| 2011/0140428 | A1 | 6/2011 | Wakata et al. | |
| 2011/0295437 | A1* | 12/2011 | Lu | H02P 9/105 700/287 |
| 2012/0248772 | A1 | 10/2012 | Shigemizu et al. | |
| 2012/0300510 | A1* | 11/2012 | Jensen | H02J 3/36 363/35 |
| 2013/0131878 | A1* | 5/2013 | Wilkins | G06F 1/26 700/287 |
| 2013/0187383 | A1* | 7/2013 | Esbensen | F03D 7/043 290/44 |
| 2014/0035284 | A1* | 2/2014 | Bech | F03D 7/0284 290/44 |
| 2014/0146582 | A1* | 5/2014 | Gupta | H02M 7/7575 363/35 |
| 2014/0225370 | A1* | 8/2014 | Mayer | H02J 3/16 290/44 |
| 2014/0339830 | A1* | 11/2014 | Gupta | F03D 7/00 290/44 |
| 2015/0137518 | A1* | 5/2015 | Yin | F03D 7/0284 290/44 |
| 2015/0137520 | A1* | 5/2015 | Garcia | H02J 3/1885 290/44 |
| 2015/0159627 | A1* | 6/2015 | Nielsen | F03D 7/0284 290/44 |
| 2015/0198145 | A1* | 7/2015 | Diedrichs | F03D 7/04 700/287 |
| 2015/0295529 | A1* | 10/2015 | Rose, Jr. | H02P 9/305 290/44 |
| 2015/0300318 | A1* | 10/2015 | Mayer | F03D 7/0272 290/44 |
| 2015/0333677 | A1* | 11/2015 | Letas | H02J 3/386 290/44 |
| 2016/0020639 | A1* | 1/2016 | Pudipeddi | H02J 7/0042 320/108 |
| 2016/0308369 | A1* | 10/2016 | Gupta | H02J 3/16 |
| 2017/0133971 | A1* | 5/2017 | Huang | H02H 7/09 |
| 2017/0187186 | A1* | 6/2017 | Premm | H02J 3/50 |
| 2017/0187190 | A1* | 6/2017 | Asano | H02J 3/383 |
| 2017/0198681 | A1* | 7/2017 | Petri Ortega | F03D 9/255 |
| 2017/0214337 | A1* | 7/2017 | Baronian | H02M 7/539 |
| 2017/0234299 | A1* | 8/2017 | Kjær | F03D 7/042 290/44 |
| 2017/0286834 | A1* | 10/2017 | Kong | G06N 3/00 |
| 2017/0294875 | A1* | 10/2017 | Xu | H02M 7/49 |
| 2017/0314534 | A1* | 11/2017 | Gupta | F03D 7/0284 |
| 2017/0335824 | A1* | 11/2017 | Gupta | F03D 7/0284 |

FOREIGN PATENT DOCUMENTS

| | | |
|---|---|---|
| EP | 2605357 A1 | 6/2013 |
| EP | 2629386 A1 | 8/2013 |
| EP | 2662944 A1 | 11/2013 |

OTHER PUBLICATIONS

Engelhardt et al: "Reactive Power Capability of Wind Turbines Based on Doubly Fed Induction Generators", IEEE Transactions on Energy Conversion, Mar. 2011, pp. 364-372.
Kayikci M et al: "Reactive Power Control Strategies for DFIG-Based Plants", IEEE Transactions on Energy Conversion, IEEE Service Center, Piscataway, NJ, US, vol. 22, No. 2, Jun. 1, 2007, pp. 389-396.
Martinez et al: "Design and coordination of a capacitor and on-load tap changer system for voltage control in a wind power plant of doubly fed induction generator wind turbines", Wind Energy, vol. 15, No. 4, 13305394, May 2012, pp. 507-523.
Mansour Mohseni et al: "Review of international grid codes for wind power integration: Diversity, technology and a case for global standard", Renewable and Sustainable Energy Reviews, Elseviers Science, New York, NY, US, vol. 16, No. 6, Mar. 18, 2812, pp. 3876-3898.
International Search Report for PCT/DK2014/050400, dated Apr. 13, 2015.
Danish Search Report for PA 2013 70760, dated Jul. 24, 2014.

* cited by examiner

| SCENARIO | Vpcc | PF OF VVPP AT PCC | Ppcc (MW) | Qpcc (MVAr) | REACTIVE COMP. (MVAr) | MAX CABLE LOADING & CABLE NAME | MAX VOLTAGE[PU] & BUS NAME | Mn VOLTAGE [pu] & BUS NAME | Q Sum WTG |
|---|---|---|---|---|---|---|---|---|---|
| A | 1.00 | UPF | 25.69 | 0 | 0 | 60.82-C_GRP1B_T10 | 1.01-WTGT12LV | 1.00-PCC_BUS | 1.65 |
| B | 1.00 | 0.95 CAP | 25.69 | 8.44 | 4.85 | 61.42-C_GRP1B_T10 | 1.03-WTGT12LV | 1.00-PCC_BUS | 5.28 |
| C | 1.00 | 0.95 IND | 25.66 | -8.43 | 0 | 64.00-C_GRP1B_T10 | 1.00-WTGT12HV | 0.98-WTGT1LV | -6.52 |
| D | 0.94 | UPF | 25.66 | 0 | 0 | 64.63-C_GRP1B_T10 | 0.96-WTGT12LV | 0.94-PCC_BUS | 1.99 |
| E | 0.94 | 0.95 CAP | 25.66 | 8.43 | 5.86 | 65.16-C_GRP1B_T10 | 0.97-WTGT12LV | 0.94-PCC_BUS | 5.28 |
| F | 0.94 | 0.95 IND | 25.63 | -8.42 | 0 | 67.99-C_GRP1B_T10 | 0.94-WTGT12LV | 0.92-WTGT1LV | -6.14 |
| G | 1.06 | UPF | 25.71 | 0 | 0 | 57.43-C_GRP1B_T10 | 1.07-WTGT12LV | 1.06-PCC_BUS | 1.35 |
| H | 1.06 | 0.95 CAP | 25.71 | 8.45 | 4.05 | 58.10-C_GRP1B_T10 | 1.08-WTGT12LV | 1.06-PCC_BUS | 5.28 |
| I | 1.06 | 0.95 IND | 25.69 | -8.44 | 0 | 60.44-C_GRP1B_T10 | 1.06-WTGT12HV | 1.04-WTGT1LV | -6.85 |
| J | 1.00 | UPF | -0.05 | 0 | -0.52 | 1.38-C_GRP1B_T10 | 1.00-WTGT13HV | 1.00-WTGT2LV | 0 |

FIG. 4A

| SCENARIO | Vpcc | PF OF VWPP AT PCC | Ppcc (MW) | Qpcc (MVAr) | REACTIVE COMP. (MVAr) | MAX CABLE LOADING & CABLE NAME | MAX VOLTAGE[pu] & BUS NAME | MIN VOLTAGE [pu] & BUS NAME | Q Sum WTG |
|---|---|---|---|---|---|---|---|---|---|
| A | 1.00 | UPF | 22.12 | 0 | 0 | 52.37-C_GRP1BT10 | 1.01-WTGT12LV | 1.00-PCC_BUS | 1.09 |
| B | 1.00 | 0.95 CAP | 22.1 | 7.26 | 0 | 55.11-C_GRP1BT10 | 1.04-WTGT12LV | 1.00-PCC_BUS | 8.5 |
| C | 1.00 | 0.95 IND | 22.1 | -7.26 | 0 | 55.11-C_GRP1BT10 | 1.00-WTGT12HV | 0.98-WTGT1LV | -6.98 |
| D | 0.94 | UPF | 22.1 | 0 | 0 | 55.66-C_GRP1BT10 | 0.95-WTGT12LV | 0.94-PCC_BUS | 1.36 |
| E | 0.94 | 0.95 CAP | 22.08 | 7.25 | 0 | 58.57-C_GRP1BT10 | 0.98-WTGT12LV | 0.94-PCC_BUS | 8.78 |
| F | 0.94 | 0.95 IND | 22.07 | -7.25 | 0 | 58.57-C_GRP1BT10 | 0.94-WTGT12HV | 0.92-WTGT1LV | -6.68 |
| G | 1.05 | UPF | 22.13 | 0 | 0 | 49.44-C_GRP1BT10 | 1.07-WTGT12LV | 1.06-PCC_BUS | 0.85 |
| H | 1.05 | 0.95 CAP | 22.11 | 7.27 | 0 | 52.04-C_GRP1BT10 | 1.09-WTGT12LV | 1.06-PCC_BUS | 8.25 |
| I | 1.05 | 0.95 IND | 22.11 | -7.27 | 0 | 52.04-C_GRP1BT10 | 1.05-WTGT12HV | 1.04-WTGT1LV | -6.24 |
| J | 1.00 | UPF | -0.05 | 0 | -0.52 | 1.38-C_GRP1BT10 | 1.00-WTGT13HV | 1.00-WTGT2LV | 0 |

WIND POWER PLANT, AND A METHOD FOR INCREASING THE REACTIVE POWER CAPABILITY OF A WIND POWER PLANT

TECHNICAL FIELD

The present disclosure describes embodiments generally relating to a wind power plant, and to a method for increasing a wind power plant reactive power capability.

BACKGROUND

The development and acceptance of wind energy as a clean and productive source of alternative energy is proliferating. Wind energy can be captured by a wind turbine generator, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbine generators may be arranged together to form a wind park or wind power plant.

The significant growth in acceptance of wind power generation has led to various countries and electrical grid operators implementing stringent grid connection requirements, also known as grid codes. Some grid codes require a wind power plant to meet a certain reactive power requirement such that the wind power plant is capable of importing and/or exporting reactive power during voltage disturbances in the grid.

Power factor can be generally be defined as the ratio of real power flowing to the load to the apparent power in the circuit. Generally, the grid requirements are defined in terms of absolute power factor values, which depend on active power dispatched by the wind power plant, at the point of common coupling.

Some grid codes, however, do define their power factor requirement as an amount of reactive power imported or exported based on the nominal rating of the WPP and irrespective of the active power generation. As such, power factor requirement can be identified as a reactive power requirement. In such cases, additional reactive power compensation is required for the wind power plant to meet the grid code. Typically, this compensation is provided by a dynamic reactive power source, such as a static synchronous compensator (STATCOM) or a static VAR compensator (SVR). However, such compensation equipment can be prohibitively expensive, for example, US$1 M for a 5 MVAR STATCOM, which adversely increases the capital costs for implementing a wind power plant.

Further, complications may arise, if for some reason, the reactive power compensation for which the wind power plant relies on for grid code compliance becomes unavailable. As a result, the wind power plant would not be able to meet grid code requirements at full generation, which may lead to financial penalties for the plant operator.

SUMMARY

There is as such a desire for a method for controlling a wind power plant which can reduce the reliance of the wind power plant on costly compensation equipment, and provide a compliance with grid code power factor requirements.

According to various embodiments, there is provided a method for increasing the reactive power capability of a wind power plant, including: receiving a reactive power requirement from a grid; determining an active power generated by the wind power plant; checking if the reactive power requirement is satisfied by the wind power plant based on the active power generated by the wind power plant; and controlling the wind power plant to curtail the active power generated by the wind power plant by a curtailment amount when the reactive power requirement is not satisfied, and in response to a grid event.

According to various embodiments, there is provided a wind power plant, including: a plurality of wind turbine generators; a power plant controller configured to: receive a reactive power requirement from an electrical grid; determine an active power generated by the wind power plant; check if the reactive power requirement is satisfied by the wind power plant based on the active power generated by the power plant; and control the wind power plant to curtail the active power generated by the wind power plant by a curtailment amount when the reactive power requirement is not satisfied, and in response to a grid event.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Embodiments of a method increasing a wind power plant reactive power capability and a wind power plant are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. A wind power plant and a wind turbine generator operating in the wind power plant according to various embodiments can include a controller which may include a memory which is for example used in the processing carried out by the wind power plant controller and/or the wind turbine controller. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to various embodiments in the present disclosure and may encompass a "circuit" as above, or may be understood to be any kind of a logic-implementing entity therefrom.

Figure 1:
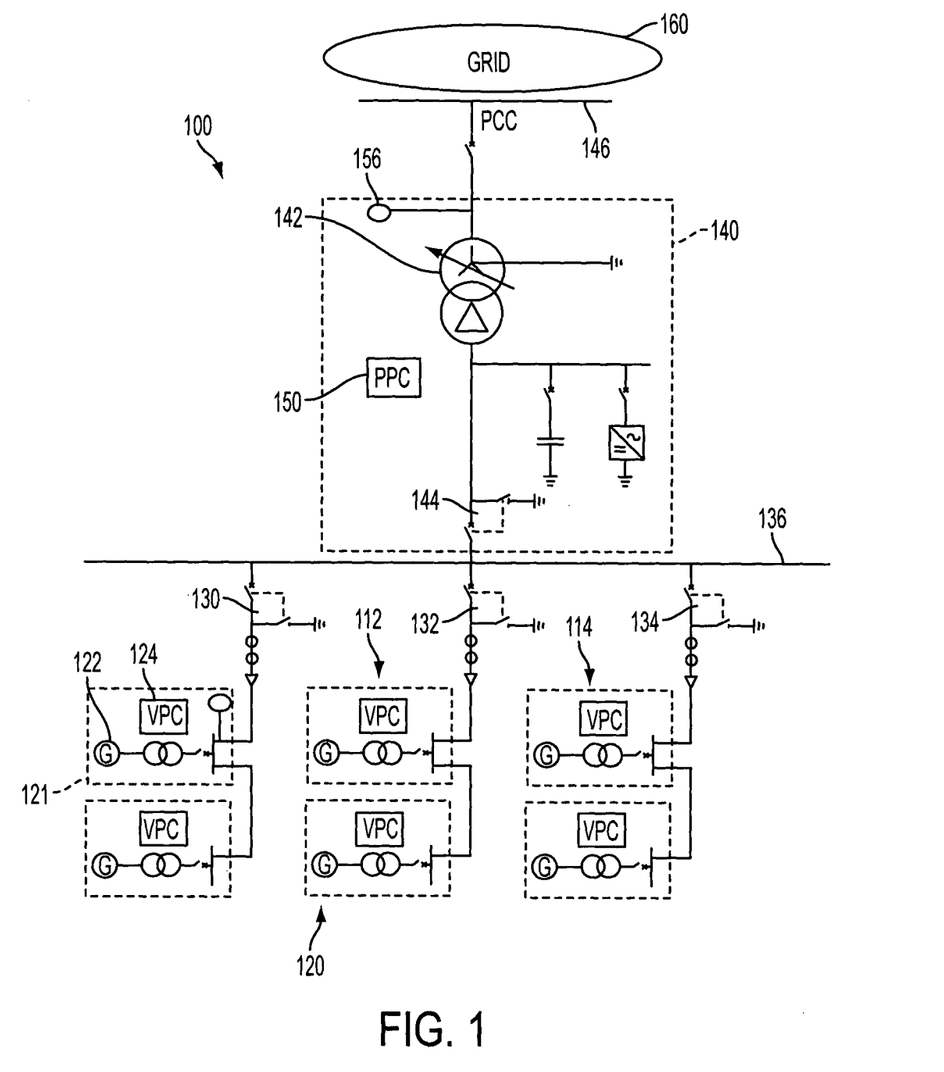
FIG. 1 illustrates a wind power plant according to an embodiment.

FIG. 1 illustrates a wind power plant according to an embodiment. In an embodiment, wind turbine plant or a wind power plant 100, is provided. A wind power plant is typically formed as a collection of wind generation units, or wind turbine generators, such that control is centralized and a single coupling is made to an electrical transmission grid, or an electrical grid, or an electrical grid, or a power grid 160. In various embodiments, the wind power plant 100 can be connectable to an electrical grid 160.

In an embodiment, wind power plant 100 includes a plurality of transmission branches 110, 112, 114, each including a plurality of wind turbine generators, or wind turbines, 120 electrically connected to a corresponding transmission branch. In an embodiment, the wind power plant 100 includes a fleet of similar wind turbine generators 120. Wind turbine generator 121 is used as a reference in the present disclosure for a description which can apply to the plurality of wind turbine generators 120. In other embodiments, it is possible to have a variety of wind turbine generators connected to the transmission branches in the wind power plant. This is as wind turbine generators are typically geographically distributed at various locations where prevailing winds would be better utilized by different types of wind turbine generators. In an embodiment, there are two wind turbines connected to transmission branches 110, 112, 114. However, there are typically no guidelines as to the number of wind turbines per transmission branch, simply by preference of physical location.

Each transmission branch 110, 112, 114 is coupled to a plant distribution busbar 136, which may also be known as a main busbar, by a transmission branch circuit breaker 130, 132, 134. The function of the transmission branch circuit breaker is to protect both the wind turbines connected to the transmission branch and the other portions of the wind power plant from power surges or spikes which might take place when there is a fault in the electrical grid or in the plant. In such an instance, the circuit breaker trips into an open circuit condition, and isolates the transmission branch from the wind power plant, until the fault is identified and addressed, and the electrical system is back in order for the reconnection of the transmission branch.

The plant substation 140 is coupled to the plant distribution busbar 136. Plant substations can either be a physical area of the wind power plant or an aggregated number of features spread over the plant. In an embodiment, the substation 140 is presented as being located in one physical area. According to the embodiment, the main components of the substation 140 are the main transformer 142, which steps up generated power in the plant to an appropriate voltage to be provided to an electrical grid 160, and the main switchgear 144, which defines an active switch for the wind power plant. The plant substation 140 sits in between the transmission branches 130, 132, 134 of the wind power plant 100 and the point of common coupling 146 to the electrical grid 160.

According to an embodiment, some power compensation equipment 148 is located together with the plant substation 140. In an embodiment, the power compensation equipment 148 includes a number of static synchronous compensators (STATCOMs), but other alternatives could also be possible, such as: switched capacitor banks, switched inductor banks, static condensers, and synchronous condensers. The power compensation equipment 148 is used to control the power factor, the level of reactive power contributed, or the voltage level of the point of common coupling 146. In other embodiments, the power compensation equipment could be distributed to and located at each wind turbine generator 120.

Operation of the wind power plant 100 is controlled by a power plant controller ("PPC") 150 that dispatches various reference set points to individual wind turbine generators 120 in the wind power plant 100. The power plant controller 150 also receives multiple sources of measurements or output readings from each wind turbine generator 120, as well as from various locations on the transmission branches 110, 112, 114, the distribution busbar 136, the plant substation 140, and the electrical grid 160, and uses the information received to optimize the wind power plant fault current contribution to the electrical grid. The power plant controller 150 can also receive set points for operation from the grid operator of the electrical grid 160 the wind power plant 100 is coupled to. According to an embodiment, the PPC 150 of the wind power plant 100 is part of a supervisory control and data acquisition (SCADA) network coupling the plant 100 and the plurality of wind turbine generators 120 in the plant 100 to a remote data and control center. The plant SCADA network can include data transmission coupling between plant and turbine controllers provided by a laid fiber optic transmission.

In an embodiment, a sensor 152 is provided at the point of common coupling 146, and the resultant output is provided to the PPC 150 for monitoring of electrical characteristics of the electrical grid 160. A voltage, current and power characteristic can be monitored, and post-processed to various useful characteristic formats by the PPC 150.

Wind turbine generator 121 can include a plurality of rotor blades driving a rotating main shaft which is mechanically coupled to a gearbox which steps up the rotation for a high-speed generator shaft of a power production system 122. In an embodiment, the power production system 122 includes a doubly fed induction generator (DFIG in which the generator shaft is coupled to the generator rotor or Type3). In an embodiment, the generator is a Full Converter Generator (Type4) generator. The Type4 generator is coupled to a full scale power converter. The method as described in embodiments of the present disclosure is applicable to both Type3 and Type4 machine. In the doubly fed induction generator, mechanical torque is converted into electrical power, which is thereafter provided to a frequency converter for power conditioning. The output of the frequency converter is stepped up with a transformer provided in the turbine, which subsequently produces electrical power rated at 30 kV (it can be any voltage rating from 10 kV to 35 kV) to the transmission branch 110. In various embodiments, the transformer can step the electrical power up to a voltage rating of from 10 kV to 35 kV.

In other embodiments, the turbines in the plant can include a power production system including a generator which can be a singly-fed synchronous generator, an induction generator, a permanent magnet generator or any other type of generator including a stator winding. Further, turbines in other embodiments can include a power production system including direct drive or other alternative drive systems, which eliminate the use of a traditional gearbox. Any wind turbine power production system electrical configuration can be possible in satisfying the purpose of electrical power generation from kinetic wind capture.

According to an embodiment, in normal operation, wind turbine generator 121 receives a power reference from the PPC 150 such that a controlled output of electrical power is generated. The power references generated by the PPC 150 depends on the grid operating condition as experienced by the grid 160 operator, as well as the presently experienced wind for energy conversion. In an embodiment, the power reference from the PPC 150 can be provided as an active power reference P* and a reactive power reference Q*, indicating to the wind turbine generator 121 as the required amount of power to be generated and supplied by the wind turbine generator 121 as part of the wind power plant's contribution to the electrical grid 160. In an embodiment, the power reference from the PPC 150 can also be a power factor reference, which can be defined as the ratio of the real power to the apparent power in the circuit In an embodiment, wind turbine generator 121 includes a wind turbine controller (not shown). The wind turbine controller includes control capabilities for controlling various aspects of wind turbine functionality, for example, wind capture optimization in nacelle yaw and blade pitch capabilities, emergency procedures such as emergency brake or turbine shutdown, or electrical production control. In various embodiments, the wind turbine controller is configured to maximize power production, whilst preventing damage to the wind turbine or to the load.

In an embodiment, the wind turbine controller can include a wind turbine power controller 124. The wind turbine power controller 124 can be provided with processing power, such as with computers, microprocessors, microcontrollers, digital signal processing (DSP) boards, Application Specific Integrated Circuits (ASICs) or any others, and with accompanying appropriate memory modules or any non-transitory computer-readable storage medium.

The wind turbine power controller 124 is provided for the supervision of the power production capability of the wind turbine generator 121. In various embodiments, the wind turbine power controller 124 is coupled to the PPC 150 and receives from the PPC an active power reference P* and a reactive power reference Q* for a provision requirement of the wind turbine generator 121 to the plant 100. Further, the wind turbine power controller 124 is coupled to and is constant communication with the wind turbine controller. In various embodiments, information regarding the control of the wind turbine generator 121 is provided to the wind turbine controller for executing, and sensor information is provided to the wind turbine power controller 124 for use in optimizing power generation by the wind turbine generator 120. Under normal operating conditions the turbine will follow the P* and Q* reference from the PPC.

Figure 2:
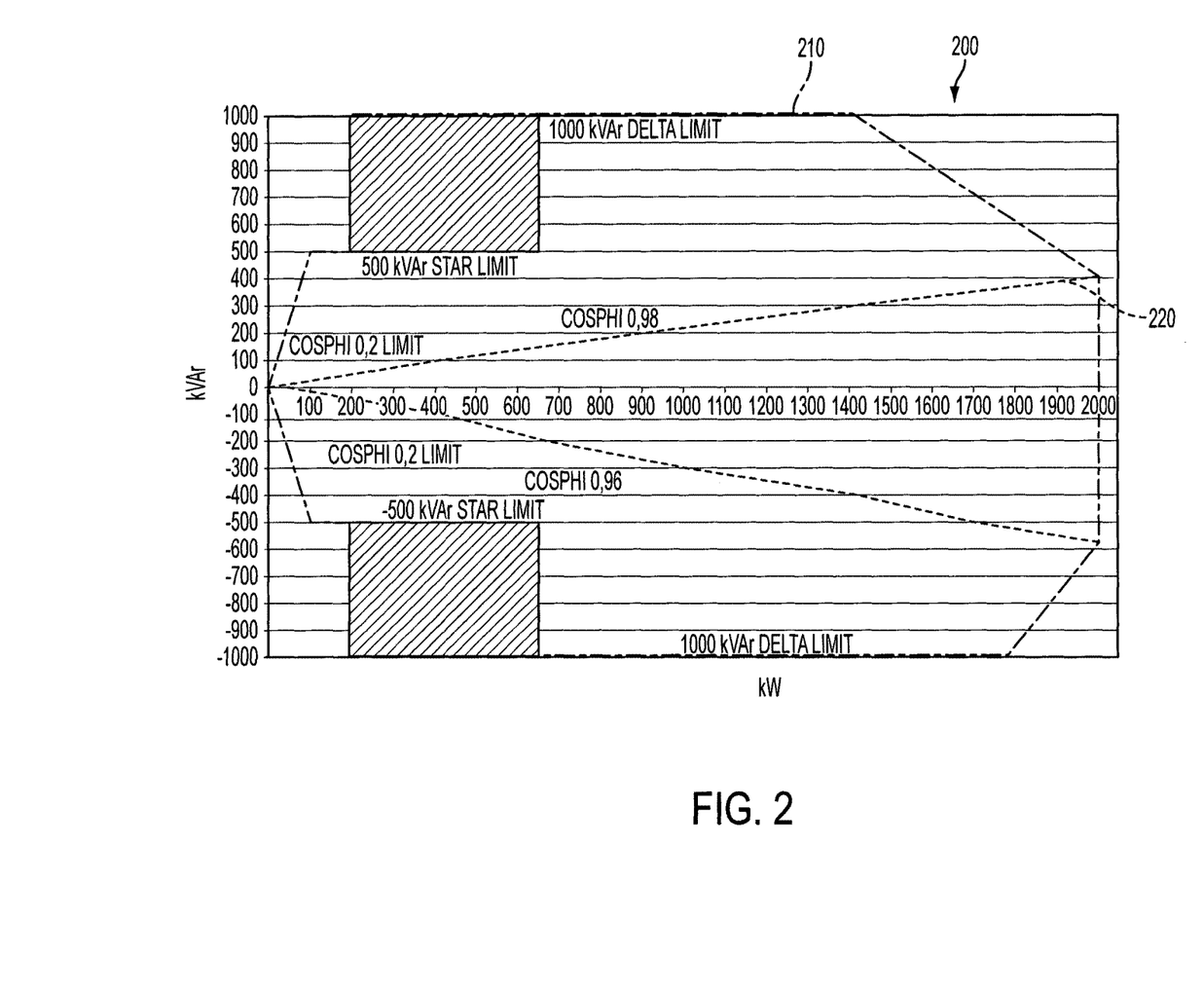
FIG. 2 illustrates an active and reactive power capability of a Type 3 wind turbine generator.

FIG. 2 illustrates an active and reactive power capability of a Type 3 wind turbine generator 121. In an embodiment, the Type 3 wind turbine comprises a doubly-fed induction generator as part of the power production system 122 of the wind turbine generator 121. In the embodiment, the wind turbine generator 121 has a production capability of 2 MW. Chart 200 illustrates the PQ capability of the wind turbine generator 121. As mentioned above, any type of wind turbine generator can be utilized in the wind power plant for power generation.

Curve 210 shows the reactive power capability of the wind turbine generator 121. It can be observed that the wind turbine generator 121 has a limited reactive power capability at full active power generation, and provides a much larger capability at lower active power generation. For example, at a wind turbine generator output of 2.0 MW, the wind turbine generator 121 can produce a reactive power output of 0.406 MVAR, while at an active power output of 1.4 MW, the wind turbine generator can produce a reactive power output of 1.0 MVAR.

As mentioned above, power factor can be defined as the ratio of the real power to the apparent power in the circuit, with a value from between 0 to 1. Positive and negative signs are used to distinguish between capacitive and inductive operation. Power factor as such can be defined as: P/S, where P is the active power (measured in watts (W)) and S is the apparent power (measured in volt-amperes (VA)).

Further, alternating current (AC) power components can be expressed as vectors in a vector triangle such that: $S^2=P^2+Q^2$, where Q is the reactive power (measured in reactive volt-amperes (VAR)). If $\phi$ is the phase angle between current and voltage, then the power factor is equal to the cosine of the angle, i.e. cos φ, and |P|=|S|cos φ.

Curve 220 illustrates the maximum available reactive power of a wind turbine generator at its full rating. It can be observed that at reactive power capability curve 210 of the wind turbine generator 121 can supply higher amount of reactive power. However, it can be noted that the active power generation of wind turbine must be reduce to achieve the higher reactive power capability of the wind turbine generator.

Figure 3A:
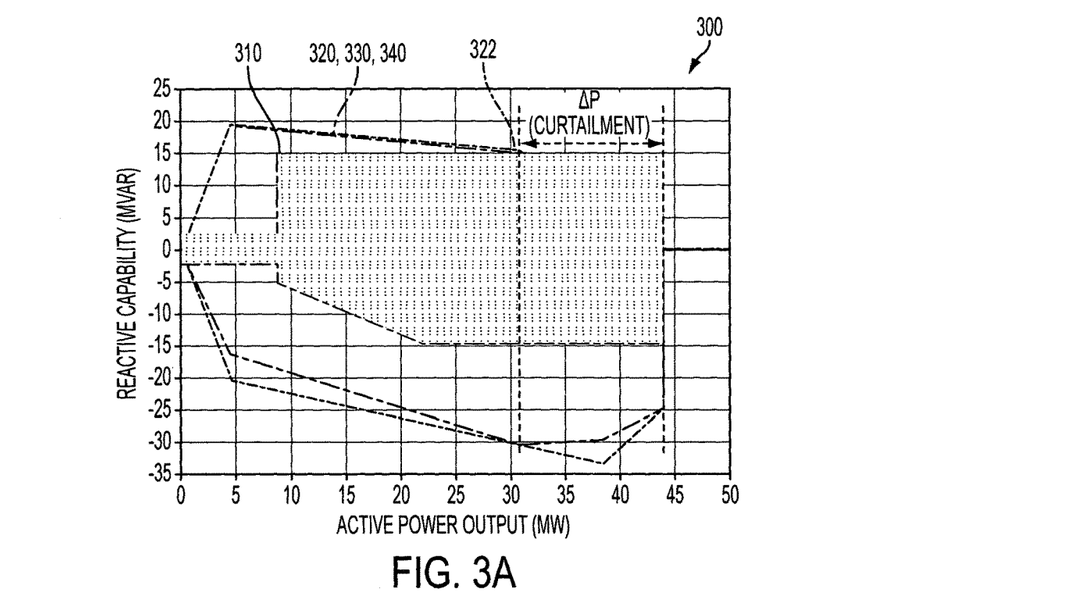
FIG. 3A illustrates a PQ chart of a wind power plant according to an embodiment.

FIG. 3A illustrates a PQ chart 300 of a wind power plant according to an embodiment. PQ can be understood to be taking reference to active power (P) and reactive power (Q). In an embodiment, a wind power plant is provided, the wind power plant 100 including a plurality of wind turbine generators 120, the wind turbine generators for converting wind energy to electrical energy. In an embodiment, the wind power plant includes 22 wind turbine generators rated at 2 MW each. As such, the wind power plant is rated at 44 MW. In other words, the 22 wind turbine generators 120 in the wind power plant are able to provide up to a combined active power output of 44 MW. Other models and configurations of wind turbine generators and combinations therefrom are of course possible in forming a wind power plant.

Curve 310 provides a representative grid code requirement for compliance by the wind power plant 100. Generally, the wind power plant 100 is expected to provide a reactive power output of about 14.9 MVAR with respect to a plant active power output from 8 MW to 44 MW (rated output). At a negative output consideration, the requirement curve 310 indicates an increasing reactive power requirement from 8 MW to about 22 MW, from where a reactive power output of about −14.9 MVAR is required for a plant active power output from 22 MW to 44 MW (rated output). It is noted that even though the grid requirement calls for the wind power plant to be capable of generating the respective reactive power, it does not necessarily require the wind power plant to inject the indicated reactive power all the time. Reactive power is typically supplied to the grid when there is a fluctuation of grid voltage, or a deviation of the grid voltage from a normal operation range. The reactive power is typically regulated to stabilize the grid voltage during grid voltage fluctuations. In times of grid voltage fluctuations, the wind power plant accordingly provides a reactive current injection based on the grid voltage into the grid, which could require as much as 1.0 p.u. of reactive current when the grid voltage drops to 0.4 p.u.

As mentioned, the reactive power is required of the wind power plant during situations of grid voltage fluctuations. In embodiments, the fluctuations are not of a lasting duration, for example, from 10 to 20 seconds. According to various transmission grid code requirements, the wind power plant is provided a short window, for example 5 seconds, to comply with the grid code requirements, as set out in curve 310.

Curve 320 highlights the reactive power capability of the wind power plant 100. Curve 320 can provide a representative outlook for the reactive power capability of a wind power plant in a first, normal operating state. Such a curve 320 is established as a result or a by-product of a grid interconnection study, or an electrical predesign study. Such studies are typically carried out for the wind power plant prior to installation and commissioning. Thorough computer-based simulations are carried out for the actual plant equipment to be installed to obtain pertinent information on the behavior of the intended wind power plant and also capabilities of the plant with respect to grid requirements.

Reactive power capability curve 320 is obtained through various studies and simulations and chart out the capabilities of the wind power plant with respect to active power output. Further, various curves are provided for operation under various grid voltage conditions. Curve 320 relates to operation under a grid voltage of 0.9 p.u., which is a slight deviation from a normal operation grid voltage of 1.0 p.u. Curve 330 relates to operation at a grid voltage of 1.0 p.u., while curve 340 relates to operation at a grid voltage of 1.10 p.u. Due to a similarity in the resultant responses, 320, 330, 340 and share a similar curve for a positive reactive power capability response, while 320 and 330 share a similar curve for a negative reactive power capability response.

As can be observed with respect to the power generation capability of wind power plant 100, when the wind power plant 100 generates an active power production amount of greater than 31 MW, the wind power plant 100 would be unable to generate sufficient reactive power to comply with the reactive power requirement 310 as set out by the grid code. In an embodiment, there is provided an intersection point 322 between the grid code requirement 310 and the reactive power capability 320 of the wind power plant at which a maximum active power can be provided while complying with grid code requirements for reactive power capability.

According to various embodiments, a method for controlling a wind power plant is provided, the wind power plant receives a power factor requirement or a reactive power requirement from a grid. In embodiments, the reactive power requirement is the curve 310 as part of the grid code for the transmission grid 160 for which the wind power plant 100 is coupled to. In embodiments, the reactive power requirement also includes a reactive power request made by the transmission grid 160. In embodiments, the transmission grid enters a period of grid voltage fluctuation, and the wind power plant 100 enters a ride through mode, wherein a reactive power is generated and supplied to the grid as part of a reactive power requirement from the grid, either with or without a reactive power request made by the grid 160. With respect to the reactive power requirement, the wind power plant 100 is provided with a requirement to be able to provide a certain amount of reactive power, with respect to the amount of active power in actual generation by the wind power plant 100.

Although the wind power plant 100 may not necessarily be required to generate the required amount of reactive power with respect to an actual active power generation, at every given time instance, it is governed by the grid code requirement 310 to be capable of providing such reactive power when requested or required. Typically, a short window, for example, 5 seconds, is provided for the wind turbine to comply with the requirements as set out in the grid code. Within such time, the wind power plant is expected to comply with the grid requirements in providing such an amount of reactive power, if there is such a need to do so in supporting a grid voltage recovery.

According to various embodiments, the method includes determining an active power generated by the wind power plant, and checking whether the reactive power requirement is satisfied by the wind power plant based on the active power generated by the wind power plant. In an embodiment, the wind power plant produces an amount of active power which exceeds the active power reference of the intersection point 322, where a maximum active power can be provided while still complying with the grid requirement. In an event where the grid requires a compliance with the grid code, for example, during a grid voltage fluctuation event, an amount of reactive power is required from the wind power plant 100, but the wind power plant under its present operating conditions would not be able to support such a requested amount of reactive power.

According to an embodiment, the method includes controlling the wind power plant to curtail the active power generated by the wind power plant by a curtailment amount when the reactive power requirement is not satisfied. In an embodiment, the PPC 150 of the wind power plant 100 carries out a curtailment of the active power generated by the plurality of wind turbine generators 120 during an event which requires the compliance of the wind power plant 100 to the grid code requirements. In an embodiment, the curtailment of active power is carried out such that the plurality of wind turbine generators in the wind power plant can generate an amount of reactive power for provision to the transmission grid, which complies with a grid code requirement, in particular a reactive power requirement.

In a representative example, the plurality of wind turbine generators 120 in the wind power plant 100 operates normally in a first operating state and enjoys ideal operating conditions to thereby generate a rated active power output of 44 MW. Upon encounter with a grid voltage deviation, a reactive power input to the transmission grid to support the grid voltage recovery is required. According to the grid code requirement curve 310, the wind power plant 100 is supposed to provide up to 14.9 MVAR of reactive power to the transmission grid 160. In order for the wind power plant 100 to be able to do so, according to an embodiment of the present disclosure, the active power output of the wind power plant 100 is curtailed in a second operating state, such as to improve the reactive power capability of the wind power plant 100 and to generate the required amount of reactive power. In the representative example, the curtailment amount, ΔP, is 13 MW.

According to an embodiment, the curtailment amount can be determined by way of the reactive power capability curve 320, which is obtained through a wind power plant grid interconnection study. The amount of active power for which the wind power plant is required to curtail in order to be able to provide a required reactive power can be determined from a comparison of the reactive power capability curve 320 and the grid code requirement curve 310. Typically, the curtailment of the active power is to an intersection point 322 at which a maximum active power can be provided while complying with grid code requirements for reactive power provision.

Figure 3B:
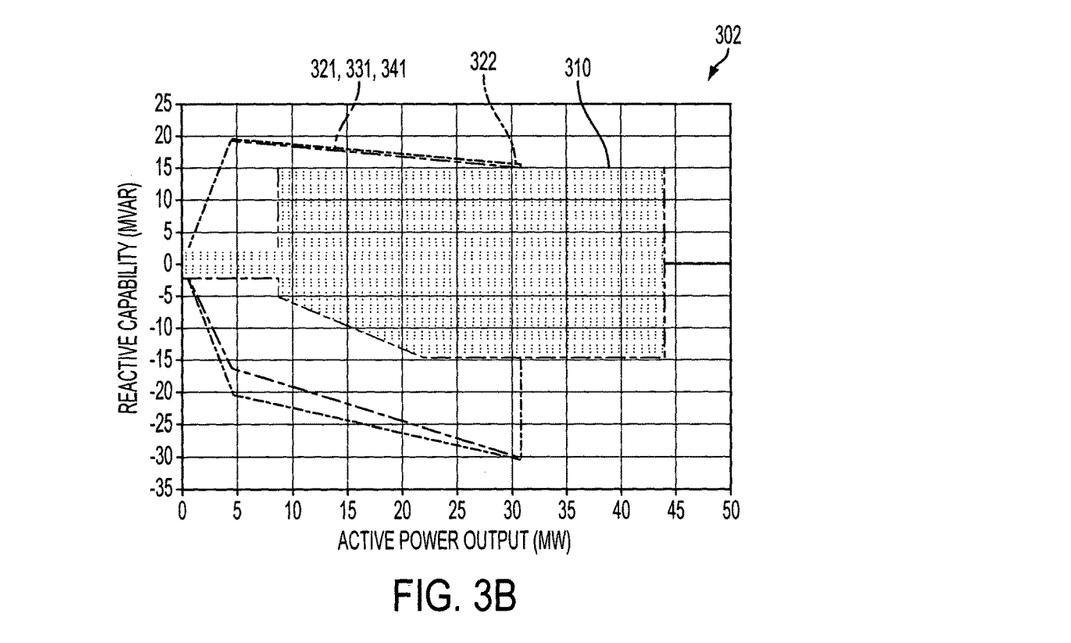
FIG. 3B illustrates a PQ chart of a wind power plant in a second state undertaking a curtailment according to an embodiment.

FIG. 3B illustrates a PQ chart 302 of a wind power plant in a second state undertaking a curtailment according to an embodiment. Curve 310 provides a representative grid code requirement for compliance by the wind power plant 100. According to an embodiment, the active power of the wind power plant 100 has been curtailed by a curtailment amount, such that the wind power plant 100 is able to comply with grid requirements and provide a reactive power capability. Curve 321 highlights the reactive power capability of the wind power plant, in accordance to an active power curtailment of the wind power plant 100. In an embodiment, the active power of the wind power plant is curtailed to where a maximum active power can be provided while complying with grid code requirements for reactive power capability. In an embodiment, this is the intersection point 322.

Also in chart 302, curve 331 and 341 are provided, relating to the PQ capability of the wind power plant in operation under a grid voltage of 1.0 p.u. and 1.1 p.u. It can also be observed that the curtailment allows the wind power plant to comply with grid code requirements operating under a grid voltage variance.

It is also highlighted that a curtailment with respect to the present disclosure is unlike a derating function which is commonly known in wind turbine generator operation. A derating function is typically carried out for a wind turbine generator where the wind turbine generator is operated below its rated maximum power, in order to prolong its remaining useful life. A derating function is typically a semi-permanent event, where once operational parameters are determined and activated in the derating to produce a derated power, the wind turbine generator does not revert to prior operational settings and generate a power higher than the derated power.

In the present disclosure, the curtailment of the wind power plant is intended to be dynamic and adaptable, and provides a solution where active power generation of the wind power plant is not compromised whilst complying with reactive power or power factor requirements at the appropriate times.

According to an embodiment, the active power of the wind power plant 100 is curtailed from its rated maximum active power provision of 44 MW to 31 MW, the maximum amount of active power which can be provided and still comply with grid code reactive power requirements. In an embodiment, the curtailment is about 30% of the rated active power generation capability of the wind power plant. According to various embodiments, the curtailment amount is derived from a grid interconnection or an electrical pre-design study.

In an embodiment, the active power of the wind power plant 100 is curtailed in a single step. According to an embodiment, the PPC 150 of the wind power plant 100 derives a plant curtailment amount from a grid interconnection study, and thereafter determines a turbine curtailment amount for each wind turbine generator in the plant. In a representative example, the wind power plant 100 is determined to require 13 MW of its presently generating active power to be curtailed, in order to comply with reactive power requirements. The PPC 150 can simply require that each of the 22 wind turbine generators in the wind power plant according to an embodiment curtail about 0.6 MW of its present active power production, in curtailing a total of 13 MW in the wind power plant 100.

According to an embodiment, the wind turbine generators in the wind power plant are controlled for curtailment based on a distributed curtailment. According to an embodiment, the active power generated by the plurality of wind turbine generators in the wind power plant is curtailed according to a priority list. In an embodiment, the PPC 150 continually monitors the active power generation of the wind turbine generators in the wind power plant, and compiles the generation output as a list. Such a list is sorted by the comparatively highest amount of active power generated, and the list can also provide or be sorted by operating efficiency or output percentage based on rated power, for example, a wind turbine generator rated at 2 MW generating 1.6 MW of power can be considered to be operating at 80% operating efficiency.

In a representative example, a wind power plant including 22 wind turbine generators and rated at 44 MW is generating about 37.4 MW of active power, or operating at about 85% efficiency. It can thus be determined that not all of the 22 wind turbine generators are operating at 100% operating efficiency. Generally, wind turbine generators in a plant do not operate at equal efficiencies due to different wind conditions, different operational settings, different health statuses, etc. According to an embodiment, the PPC determines the amount of active power to be curtailed. In the present example, the curtailment amount is 6.4 MW. In an embodiment, the PPC compiles and sorts a list of the wind turbine generators in the wind power plant based on the present operating efficiency of the wind turbine generators.

In an embodiment, the PPC identifies the present operational efficiency of the wind power plant and also the required operational efficiency in order to comply with grid requirements. According to the representative example, the PPC identifies the present operational efficiency as 85% and the required operational efficiency as about 70%. In an embodiment, the PPC identifies a wind turbine generator operating above an operating efficiency. According to an embodiment, the PPC first curtails the active power generated by the identified wind turbine generator operating above the operating efficiency before curtailing the active power generated by the remaining wind turbine generators in the wind power plant.

In an embodiment, the PPC identifies the number of wind turbine generators operating above 70% efficiency from the priority list. The PPC thereafter provides references and instructions to the identified wind turbines to curtail the active power output of the identified turbines to 70%. According to an embodiment, the 70% is determined based on the wind turbine generator reactive power capability. As can be observed from FIG. 1, the most efficient operating setting for obtaining a maximum active power together with a maximum possible reactive power takes place at 1.4 MW output, or 70% of the rated power. Such a scheme allows for easy identification as well as easy control.

In an embodiment, the PPC identifies the number of wind turbine generators operating above 85% efficiency from the priority list. The PPC thereafter distributes the plant curtailment amount of 6.4 MW evenly between the identified wind turbine generators and provides references and instructions to the identified wind turbines to curtail the active power output therefrom. In other embodiments, the PPC can identify wind turbine generators operating above 80% or 75% or 70%. The advantage of such a scheme is that the curtailment only affects relatively few turbines, allowing the rest of the wind turbines in the plant to continue operating without disruption.

In an embodiment, the PPC identifies a number of operationally efficient wind turbine generators which would carry out a curtailment process. For example, the 5 highest producing turbines in the plant are identified. Further, a percentage of the plant curtailment amount is thereafter determined to be curtailed from the identified wind turbine generators. In the example, each of the 5 identified wind turbines will undertake 20% of the curtailment amount of 6.4 MW, i.e. 1.28 MW, for curtailment of active power. According to an embodiment, the number of wind turbine generators to be identified can be based on a determined percentage of the plant curtailment amount. For example, a percentage amount of 12.5% to be curtailed by a wind turbine would result in 8 turbines being identified for curtailment. The above curtailment schemes arise from providing options for a plant operator in controlling a wind power plant. Such schemes provide an advantage as wind turbine generators operating at a lower efficiency of active power generation can already be considered to be ready for supporting the grid reactive power requirements.

According to an embodiment, the curtailment can be divided into multiple steps. In embodiments, the active power generated by the wind power plant is curtailed by the curtailment amount in two steps. According to a representative example, the curtailment amount of 13 MW can be divided into steps of 6.5 MW each. In other words, the curtailment can take place in two 0.15 p.u. steps.

According to an embodiment, if the wind power plant is operating between 70% to 90%, and high reactive power demand is requested, and the wind power plant is not able to meet it within 1 sec, then curtailment can be carried out in two steps of 6.5 MW. Dividing the curtailment amount is advantageous in the case where if the wind turbine generators are producing less than 2 MW, then it is possible that some of the WTG can supply more reactive power than others. Due to such a characteristic, a smaller curtailment can sometimes be sufficient in order for the plant to comply with grid requirements. Such a scheme is advantageous in that a reduced number of wind turbine generators as well as a reduced amount of active power need be curtailed.

According to an embodiment, in carrying out the curtailment, the PPC utilizes a priority list. In an embodiment, the first step of curtailing 6.5 MW or 0.15 p.u. can be taken out from the wind turbine generators which are producing at an efficiency higher than 70% of the rated MW of the turbine. For a 2 MW machine, if the wind turbine generator is producing more than 1.4 MW, it should fall under a curtailment threshold in the priority list. The priority list can be updated with a set sampling time. In an embodiment, the sampling time is 1 sec. If the first step curtailment is not sufficient to bring the wind power plant into compliance, then the next step of a 0.15 p.u. curtailment can be distributed equally to all WTGs. In another embodiment, the second curtailment step can involve an identified number of wind turbines.

According to an embodiment, the active power generated by the wind power plant is curtailed by a curtailment amount in three steps or four steps. By breaking down the curtailment amount, and curtailing the active power progressively, the wind power plant can moderate the amount of active power curtailed as well as possibly reduce the number of wind turbine generators being affected.

Generally, a limitation on the number of curtailment steps involved could be the timing requirement for the wind power plant to comply with the grid code. For example, certain grid codes for a transmission grid provide a 5 second requirement for the wind power plant to comply with the demanded reactive power injection to the grid. As such, a balance is typically considered in step-wise curtailment according to embodiments of the present disclosure.

Achievement of such balance could be adversely affected by the ramp down rate of the electrical generator in the wind turbine generator power production system. Various types of generators may for example have a ramp down rate of 0.2 p.u./sec. Imposing such a physical limitation could require the PPC to activate more turbines than necessary to carry out curtailment in steps, or limit the number of steps which can possibly be taken.

In various embodiments, the wind turbine generators of the wind power plant utilize a fast run back scheme to rapidly scale back on active power generation and provision in carrying out a curtailing process. In a fast run back scheme, the wind turbine generator is able to scale down to about 20% of its nominal operating power very quickly, and without excessive or additional significant loads on the mechanical elements of the wind turbine. This can take place even though a technical limitation hampers the ramp down rate of the electrical generator, by dissipating excess active power being generated through electrical resistor banks, amongst other operations carried out in the fast run back scheme. As such, utilizing a fast run back scheme for curtailment of wind turbine generator active power allows the meeting of timing requirements from the grid code, and provides flexibility in the actual decision of which turbines to curtail power from. According to an embodiment, utilizing a fast run back further allows a shorter sampling time period. In an embodiment, an active sample time can be 0.5 seconds. According to an embodiment, wind turbine generators in the wind power plant are capable of carrying out a fast ramp up of active power production after a grid event requiring reactive power provision has ceased. In embodiments, a wind turbine generator can ramp up at rates of up to 480 kW/s or higher speeds.

Figure 4A:
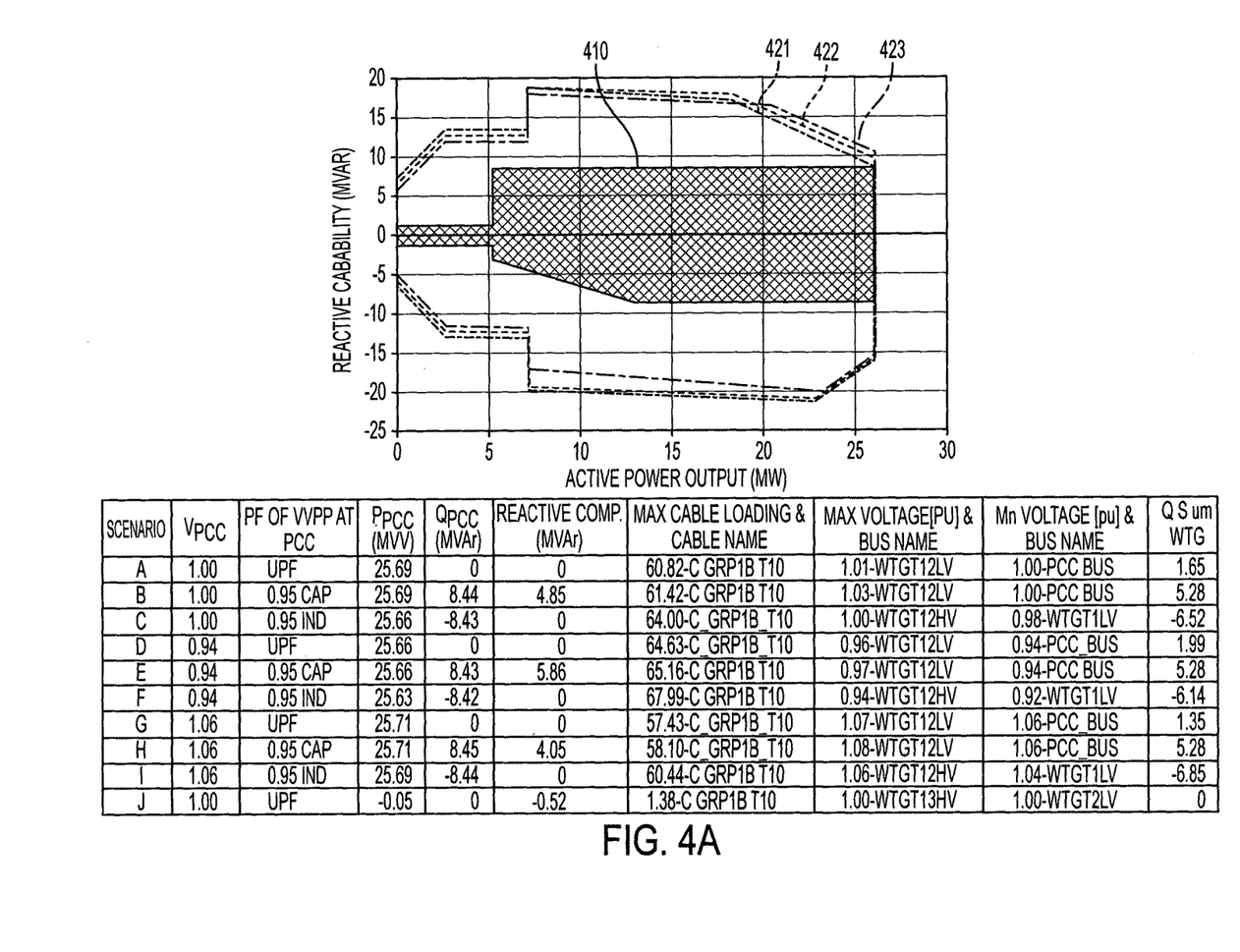
FIG. 4A illustrates a Load flow summary table and PQ chart of wind power plant requiring a STATCOM to comply with grid requirements.

FIG. 4A illustrates a Load flow summary table and PQ chart of wind power plant requiring a STATCOM to comply with grid requirements. According to a representative example, a wind power plant including a plurality of wind turbine generators is provided with a nominal rated power of 26 MW. Chart 400 includes an indication of a grid PQ requirement 410, in which can be observed, requires the wind power plant to provide a reactive power generation capability of about 9 MVAR when the wind power plant is generating an active power output of 26 MW.

Further, in the representative example, the wind power plant includes a STATCOM to support the reactive power capability of the wind power plant. In the example, the STATCOM installed in the wind power plant is capable of 6 MVAR operation. Curve 421, 422, 423 relate to the reactive power capability of the wind power plant according to the representative example, corresponding to a grid voltage of 0.94, 1.0 and 1.06 p.u. respectively. It can be observed that the reactive power capability of the turbine complies with grid requirement 410 at every point of active power generation. The provision of the 6 MVAR STATCOM provides a positive offset and supplement to the actual reactive power capability of the wind power plant. However, it is also noted that the cost of such a plant compensation equipment can be more than a million US dollars, which affects capital considerations and return-on-investment calculations in wind power plant planning. FIG. 4A further provides statistical figures illustrating how a representative wind power plant operates.

Figure 4B:
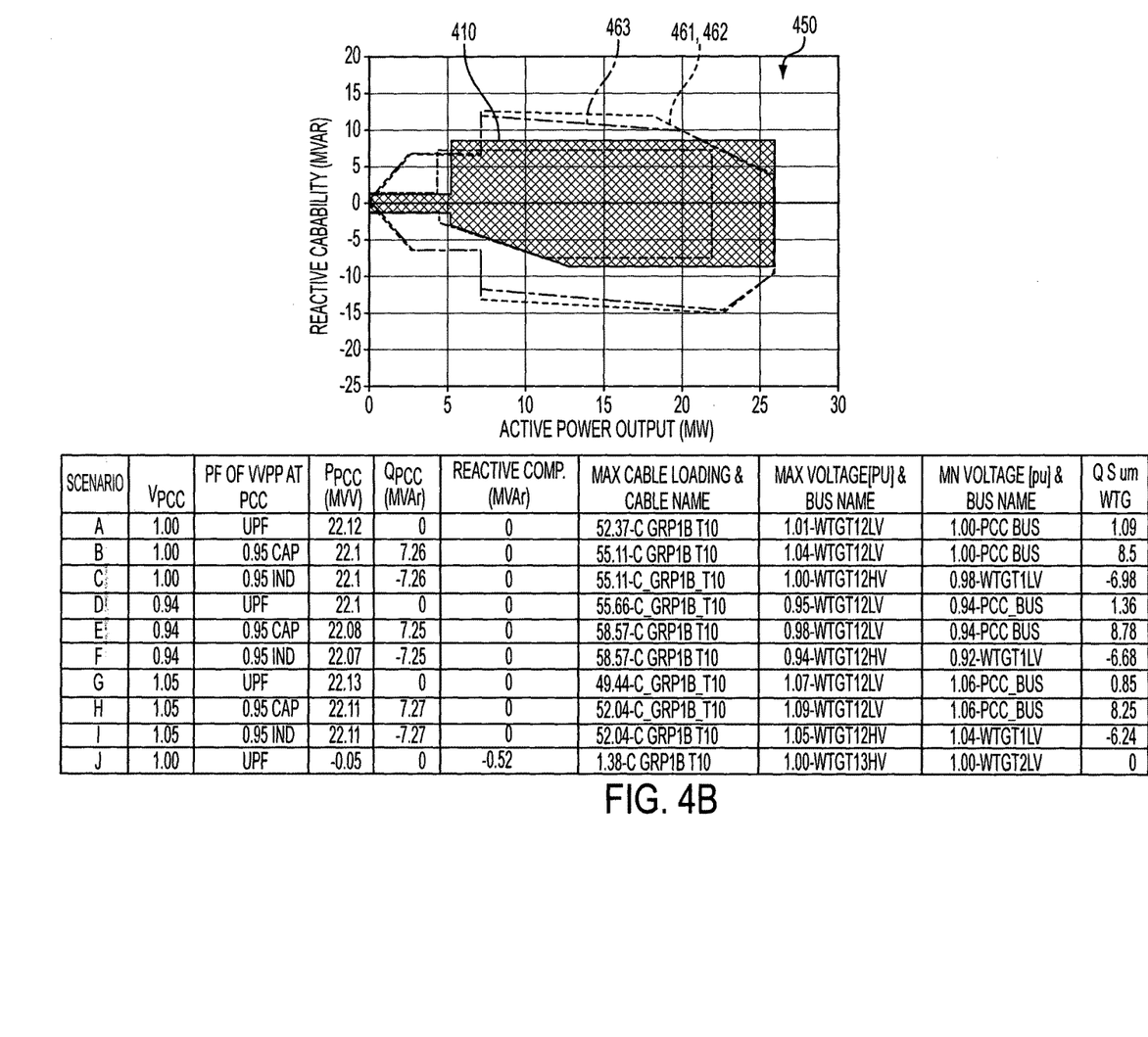
FIG. 4B illustrates a Load flow summary table and PQ chart of a wind power plant undertaking a curtailment according to an embodiment.

FIG. 4B illustrates a Load flow summary table and PQ chart of a wind power plant undertaking a curtailment according to an embodiment. In chart 450, grid PQ requirement 410 is similarly provided, for the wind power plant rated at 26 MW. Curves 461, 462 463 show the reactive power capability of the wind power plant according to the representative example, but without a STATCOM to supplement its capability. It can be observed that when the wind power plant provides an active power generation of past 22 MW, the wind power plant would fail to comply with the reactive power grid requirement 410.

According to an embodiment, the wind power plant, in response to a grid event which can include a reactive power request from the grid or a deviation in grid voltage, requires the wind power plant to support with reactive power, transitions from a first normal operating state to a second curtailment state. With respect to the representative example, the wind power plant carries out a curtailment of 4 MW to 22 MW, which correlates to the maximum amount of active power for which the wind power plant can provide in complying with the reactive power requirement.

Plot 470 illustrates the PQ grid requirement as applied to a wind power plant operating at an active power generation of 22 MW. It can be observed that upon curtailment, the wind power plant complies with the reactive power requirement as set out by the grid operators. Further, and advantageously, once the grid event expires, the wind power plant is capable of transiting back from the second curtailment state to the first normal operation state, and to continue generating a rated level of active power output, depending on the wind conditions. As such, compliance with the grid requirements can be provided, without the additional expense of physical compensation equipment. FIG. 4B further provides statistical figures illustrating the feasibility of the curtailment method according to an embodiment.

Figure 5:
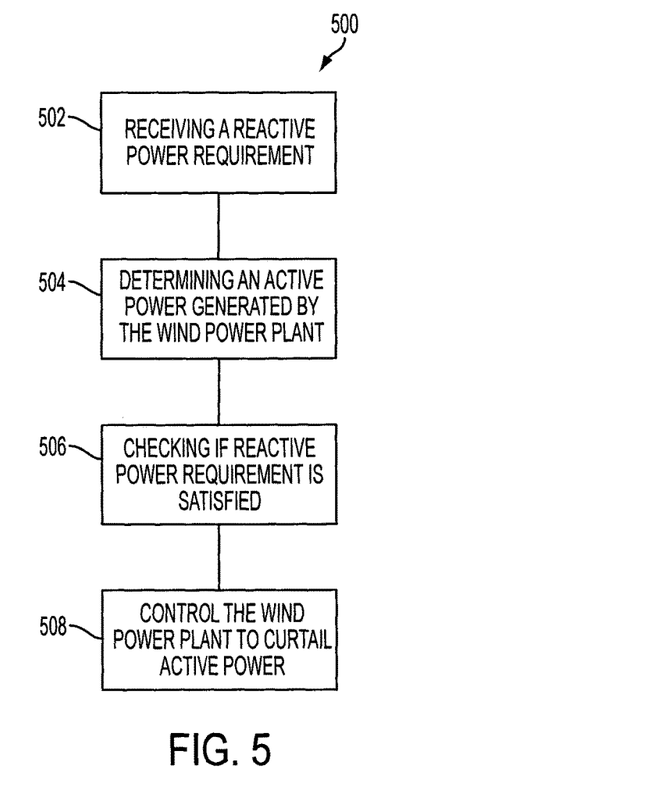
FIG. 5 illustrates a method for controlling a wind power plant according to an embodiment.

FIG. 5 illustrates a method 500 for controlling a wind power plant according to an embodiment. In an embodiment, the method is a method for increasing the reactive power capability of a wind power plant. In 510, the method includes receiving a reactive power requirement from an electrical grid. In 520, the method includes determining an active power generated by the wind power plant. In 530, the method includes checking if the reactive power requirement is satisfied by the wind power plant based on the active power generated by the wind power plant. In 540, the method includes controlling the wind power plant to curtail the active power generated by the wind power plant by a curtailment amount when the reactive power requirement is not satisfied, and in response to a grid event.

By providing such a method for increasing a wind power plant reactive power capability, a wind power plant is provided with a capability of adhering to grid code reactive power requirements at the appropriate time, which is when the grid requires the reactive power to support grid voltage recovery. Such a capability is achieved without the need of costly plant compensation equipment. With such a reduction in the balance of plant expenditure, which directly contributes to the cost of energy, the wind power plant makes for a better business case study, and improves transactional certainty.

Further, the method provides for a lessening of probability of the wind power plant operator being penalized by grid operators for not meeting reactive power requirements, especially if compensation equipment is not available. With this method, re-rating of the plant can also be dynamically adjusted based on the Q requirement from the grid. Advantageously, complying with grid code requirements can be carried out by software or firmware improvements, and not actual costly equipment or hardware changes.

In an embodiment, the method further includes determining the curtailment amount based on an electrical characterization of the wind power plant.

In an embodiment, the method further includes determining the curtailment amount by identifying a maximum active power amount which satisfies the reactive power requirement from the electrical characterization.

In an embodiment, the method further includes controlling the wind power plant to curtail the active power generated by the wind power plant by the curtailment amount in a single step.

In an embodiment, the method further includes controlling the wind power plant to curtail the active power generated by the wind power plant by the curtailment amount in a plurality of steps.

In an embodiment, the method further includes controlling a plurality of wind turbine generators in the wind power plant to curtail the active power generated by the plurality of wind turbine generators by the curtailment amount.

In an embodiment, the method further includes a distributed curtailment of the active power generated by the plurality of wind turbine generators.

In an embodiment, the method further includes first curtailing the active power generated by a wind turbine generator operating above an operating efficiency.

In an embodiment, the method further includes curtailing the active power generated by the plurality of wind turbine generators according to a priority list.

In an embodiment, the method further includes ceasing the curtailing of the active power generated by the wind power plant when the grid event discontinues.

Figure 6:
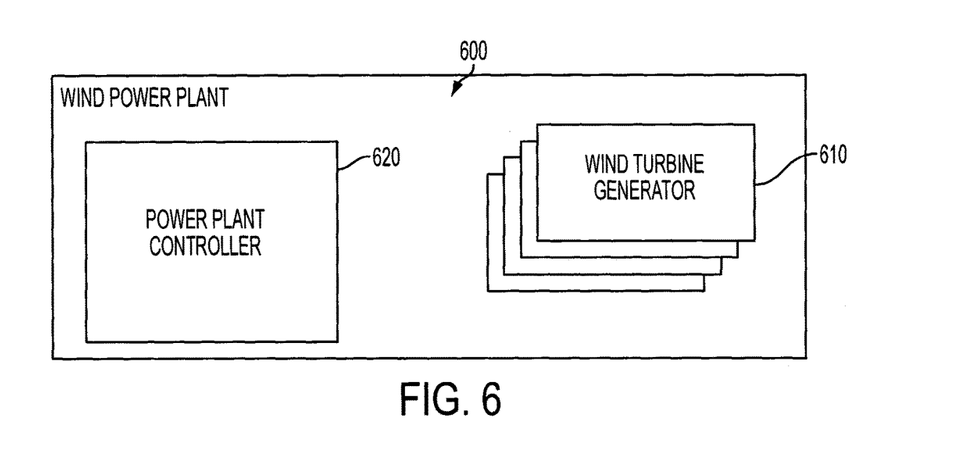
FIG. 6 illustrates a wind power plant according to an embodiment.

A wind power plant 600 is provided. In an embodiment, the wind power plant is configured to carry out the above-described method for controlling a wind power plant. In an embodiment, the wind power plant is configured to carry out a method for increasing a wind power plant reactive power capability. The wind power plant 600 includes a plurality of wind turbine generators 610. The wind power plant 600 also includes a power plant controller 620. According to an embodiment, the power plant controller 620 is configured to receive a reactive power requirement from a grid; determine an active power generated by the wind power plant; check if the reactive power requirement is satisfied by the wind power plant based on the active power generated by the power plant; and control the wind power plant to curtail the active power generated by the wind power plant by a curtailment amount when the reactive power requirement is not satisfied, and in response to a grid event.

In an embodiment, the curtailment amount is determined based on an electrical characterization of the wind power plant.

In an embodiment, the curtailment amount is determined by identifying the maximum active power amount which satisfies the reactive power requirement from the electrical characterization.

In an embodiment, the active power generated by the wind power plant is curtailed by the curtailment amount in a single step.

In an embodiment, the active power generated by the wind power plant is curtailed by the curtailment amount in a plurality of steps.

In an embodiment, a plurality of wind turbine generators in the wind power plant are controlled to curtail the active power generated by the plurality of wind turbine generators by the curtailment amount.

In an embodiment, the plurality of wind turbine generators is controlled based on a distributed curtailment.

In an embodiment, the active power generated by a wind turbine generator operating above a productivity threshold is curtailed first.

In an embodiment, the active power generated by the plurality of wind turbine generators is curtailed according to a priority list.

In an embodiment, the curtailment of active power generated by the wind power plant is ceased when the grid event discontinues.

According to various embodiments, there is provided at least one computer program product directly loadable into the internal memory of at least one digital computer provided in a wind power plant, including software code portions for performing the steps of a method according to an embodiment of the present disclosure when said at least one product is/are run on said at least one computer.

In various embodiments, a controller for carrying out an operational function in the wind power plant, which includes for example, but not limited to, a plant controller, a power plant controller, a SCADA controller, a wind turbine controller, a wind turbine power controller, or a reactive current controller, includes a digital computer configured to receive a computer program product. In embodiments, digital computers provided in the wind power plant are synchronized and operate cooperatively as part of an overall system.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method for increasing a reactive power capability of a wind power plant coupled with an electrical grid, the method comprising:
   receiving a reactive power requirement associated with the electrical grid;
   determining an active power generated by the wind power plant;
   determining, based on the active power generated by the wind power plant, whether the reactive power requirement is satisfied by the wind power plant;
   determining, based on an electrical characterization of the wind power plant, a maximum active power amount at which the reactive power requirement is satisfied;
   determining a curtailment amount for the wind power plant based on the maximum active power amount; and
   responsive to detecting a grid event:
      communicating, when the reactive power requirement is not satisfied, one or more active power set points to one or more wind turbine generators of the wind power plant to curtail the active power generated by the wind power plant by the curtailment amount.

2. The method according to claim 1, wherein communicating the one or more active power set points to curtail the active power generated by the wind power plant by the curtailment amount occurs in a single curtailing step.

3. The method according to claim 1, wherein communicating the one or more active power set points to curtail the active power generated by the wind power plant by the curtailment amount occurs in a plurality of curtailing steps.

4. The method according to claim 1, wherein communicating the one or more active power set points comprises communicating active power set points to a plurality of wind turbine generators in the wind power plant to curtail the active power generated by the plurality of wind turbine generators by the curtailment amount.

5. The method according to claim 4, further comprising:
   distributing the curtailment amount among the plurality of wind turbine generators.

6. The method according to claim 5, wherein communicating the active power set points to the plurality of wind turbine generators comprises:
   first curtailing an active power generated by a first wind turbine generator of the plurality of wind turbine generators that is operating with an efficiency greater than a predefined efficiency value.

7. The method according to claim 5, wherein communicating the active power set points to the plurality of wind turbine generators comprises:
curtailing an active power generated by individual wind turbine generators of the plurality of wind turbine generators according to a priority list.

8. The method according to claim 1, further comprising:
determining that the grid event has ended; and
communicating updated active power set points to the one or more wind turbine generators to cease the curtailing of the active power generated by the wind power plant.

9. A wind power plant, comprising:
a plurality of wind turbine generators; and
a power plant controller configured to:
receive a reactive power requirement associated with an electrical grid;
determine an active power generated by the wind power plant;
determine, based on the active power generated by the wind power plant, whether the reactive power requirement is satisfied by the wind power plant;
determine, based on an electrical characterization of the wind power plant, a maximum active power amount at which the reactive power requirement is satisfied;
determine a curtailment amount for the wind power plant based on the maximum active power amount; and
responsive to detecting a grid event:
control, when the reactive power requirement is not satisfied, the wind power plant to curtail the active power generated by the wind power plant by the curtailment amount.

10. The wind power plant according to claim 9, wherein curtailing the active power generated by the wind power plant by the curtailment amount occurs in a single curtailing step.

11. The wind power plant according to claim 9, wherein curtailing the active power generated by the wind power plant by the curtailment amount occurs in a plurality of curtailing steps.

12. The wind power plant according to claim 9, wherein controlling the wind power plant to curtail the active power generated by the wind power plant comprises:
curtailing an active power generated by a plurality of wind turbine generators of the wind power plant.

13. The wind power plant according to claim 12, wherein the power plant controller is further configured to:
distribute the curtailment amount among the plurality of wind turbine generators.

14. The wind power plant according to claim 12, wherein curtailing the active power generated by a plurality of wind turbine generators of the wind power plant comprises:
first curtailing the active power generated by a first wind turbine generator of the plurality of wind turbine generators that is operating above a productivity threshold.

15. The wind power plant according to claim 13, wherein curtailing the active power generated by a plurality of wind turbine generators of the wind power plant occurs according to a priority list.

16. The wind power plant according to claim 9, wherein the power plant controller is further configured to:
determining that the grid event has ended; and
control the wind power plant to cease the curtailment of the active power generated by the wind power plant.

17. A computer program product directly loadable into an internal memory of at least one digital computer provided in a wind power plant, comprising software code portions which, when executed on the at least one computer, perform an operation for increasing the reactive power capability of a wind power plant, the operation comprising:
receiving a reactive power requirement associated with an electrical grid;
determining an active power generated by the wind power plant;
determining, based on the active power generated by the wind power plant, whether the reactive power requirement is satisfied by the wind power plant;
determining, based on an electrical characterization of the wind power plant, a maximum active power amount at which the reactive power requirement is satisfied;
determining a curtailment amount for the wind power plant based on the maximum active power amount; and
responsive to detecting a grid event:
communicating, when the reactive power requirement is not satisfied, one or more active power set points to one or more wind turbine generators of the wind power plant to curtail the active power generated by the wind power plant by the curtailment amount.

18. The method of claim 1, further comprising:
providing an amount of reactive power from the wind power plant to the electrical grid during the grid event, wherein the amount of the reactive power is within the reactive power requirement.

19. The method of claim 1, wherein communicating the one or more active power set points causes at least a first wind turbine generator of the one or more wind turbine generators to perform one or more operations of a predefined fast run back scheme.

20. The method of claim 3, wherein communicating the one or more active power set points to curtail the active power generated by the wind power plant by the curtailment amount comprises:
communicating, in a first curtailing step of the plurality of curtailing steps, first active set points to the one or more wind turbine generators;
determining that the first curtailing step was not sufficient to satisfy the reactive power requirement; and
communicating, in a second curtailing step of the plurality of curtailing steps, second active set points to the one or more wind turbine generators.

21. The method of claim 6, wherein first curtailing the active power generated by the first wind turbine generator comprises:
determining that the first wind turbine generator of the plurality of wind turbine generators is operating with an efficiency greater than the predefined efficiency value;
determining that a second wind turbine generator of the plurality of wind turbine generators is operating with an efficiency less than the predefined efficiency value; and
curtailing an active power of the second wind turbine generator after curtailing the active power of the first wind turbine generator.

* * * * *